INVENTOR.
WARREN NOBLE

Patented Jan. 28, 1947

2,414,975

UNITED STATES PATENT OFFICE 2,414,975

DRIVE MOTOR SUPPORT

Warren Noble, Cleveland, Ohio, assignor to The Cleveland Worm & Gear Company, Cleveland, Ohio, a corporation of Ohio Application June 18, 1943, Serial No. 491,340

7 Claims. (Cl. 248—2)

The present invention relates to a device for supporting a drive motor which is connected to the drive shaft of a machinery unit such as a transmission gear, speed reducer, or the like. Heretofore it has been the practice to mount a drive motor upon either a separate bed or an extension of the bed plate or base housing of the machinery unit to which it is to be connected.

The general object and nature of my invention is to provide a drive motor support for a machinery unit, which is mounted directly upon the housing proper of the unit, is adjustable to a wide range of motor sizes, is of a relatively light, yet sufficiently sturdy construction, thereby eliminating heavy castings and adding the minimum amount of attached weight to the machinery housing; and includes means for accurately aligning the motor shaft with the driven shaft of the machinery unit.

A further object and advantage of my invention includes the feature of reducing the over-all length of the machinery drive shaft and the motor shaft connected thereto, thus permitting the motor to be located as closely as possible to the machinery unit and thereby reducing the bending moment stresses on the motor support.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
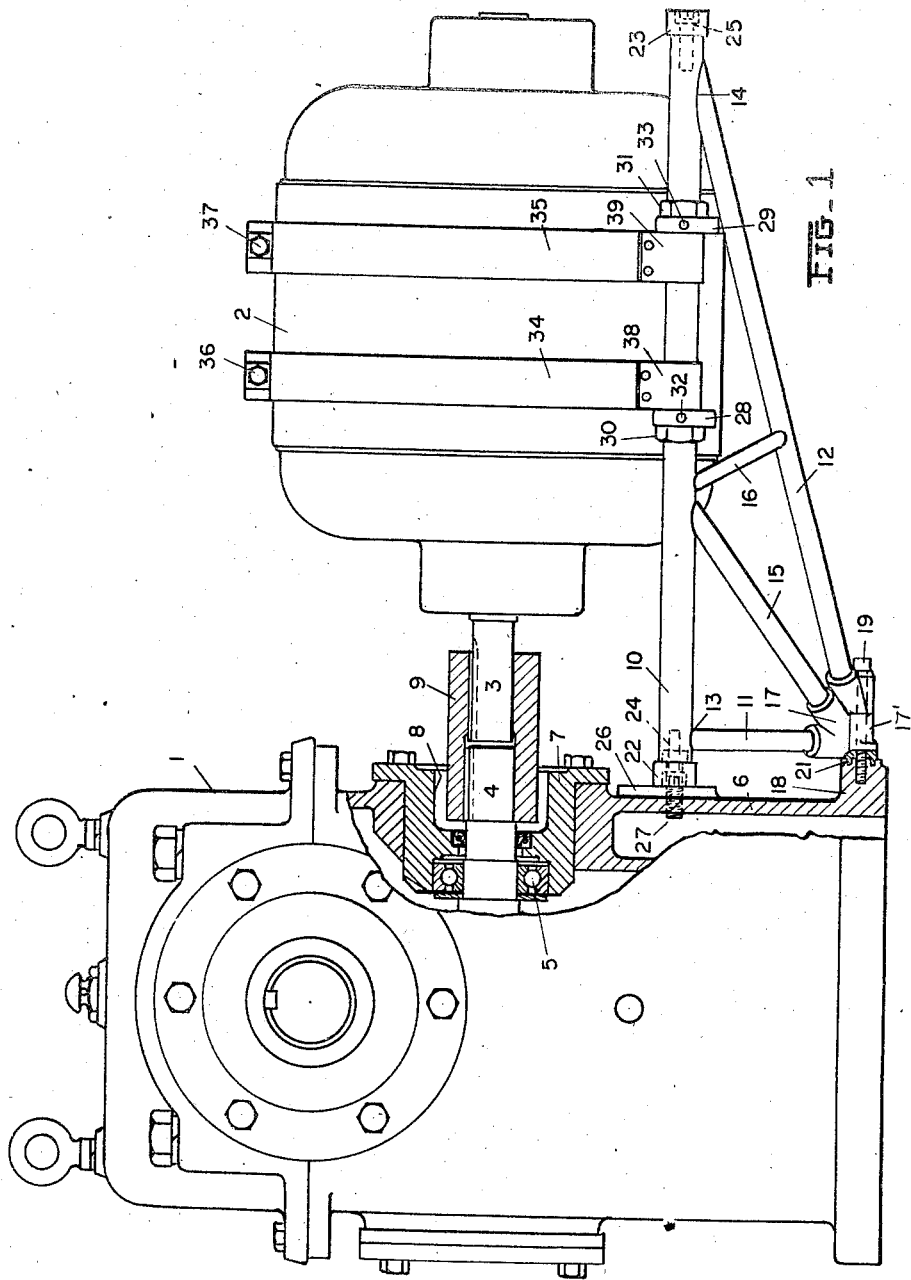
Fig. 1 is a side elevational view, with a portion of the machinery unit housing broken away in sections, illustrating a device constructed according to the principle of my invention.

Now referring more particularly to the drawings, there is shown a drive motor support as applied to a speed reducer, namely a worm gear reduction unit indicated generally at 1. The electric drive motor 2 has its drive shaft 3 connected to the worm shaft or drive shaft 4 of the reduction unit 1. The shaft 4 is supported in a bearing 5 mounted in the vertical side housing wall 6 and projects outwardly therefrom.

As shown in Fig. 1, the supporting bushing 7 which mounts the bearing 5 in the housing wall 6 contains a recessed portion 8 which is of slightly greater inner diameter than the outer diameter of the sleeve coupling 9 joining the shafts 3 and 4. The provision of the recess 8 renders it possible to shorten the shaft 4 to a considerable extent, thus reducing to a practical minimum the over-all length of the drive connection between the shafts 3 and 4 and in addition minimizing the bending stresses exerted on the motor supporting framework (subsequently to be described), which stress would otherwise be substantially greater if the drive connection between the shafts 3 and 4 were to be made at a point further to the right of, or further beyond the outer confines of the housing wall 6.

The drive motor 2 is supported upon a framework attached to the side of the housing wall 6. This framework consists of a pair of triangularly shaped frame members which are made up of the horizontal bars 10 forming the longer side of the triangle, the bars 11 forming the shorter side of the triangle, and the bars 12 forming the hypotenuse. The bars 11 and 12 are welded or otherwise suitably affixed to the bar 10 as indicated at 13 and 14, respectively. Intermediate reinforcing strut bars 15 and 16 are provided across the open interior of the triangle formed by the bars 10, 11 and 12. The bars 11, 12 and 15 are joined in a multiple socket. This multiple socket is made in a two-part construction comprising one socket piece 17 common to the bars 11, 12 and 15 of the left-hand triangle supporting framework (as viewed from Fig. 2); and the socket piece 17' common to the corresponding bars of the right-hand triangular framework. The socket pieces 17 and 17' are attached to the base flange 18 of the machinery unit 1 by means of the bolt 19 passing through aligned bores in each socket piece. The socket piece 17' also has an annular flange 21 fitting in a complementary recess in the flange 18 and surrounding the bolt 19.

Figure 2:
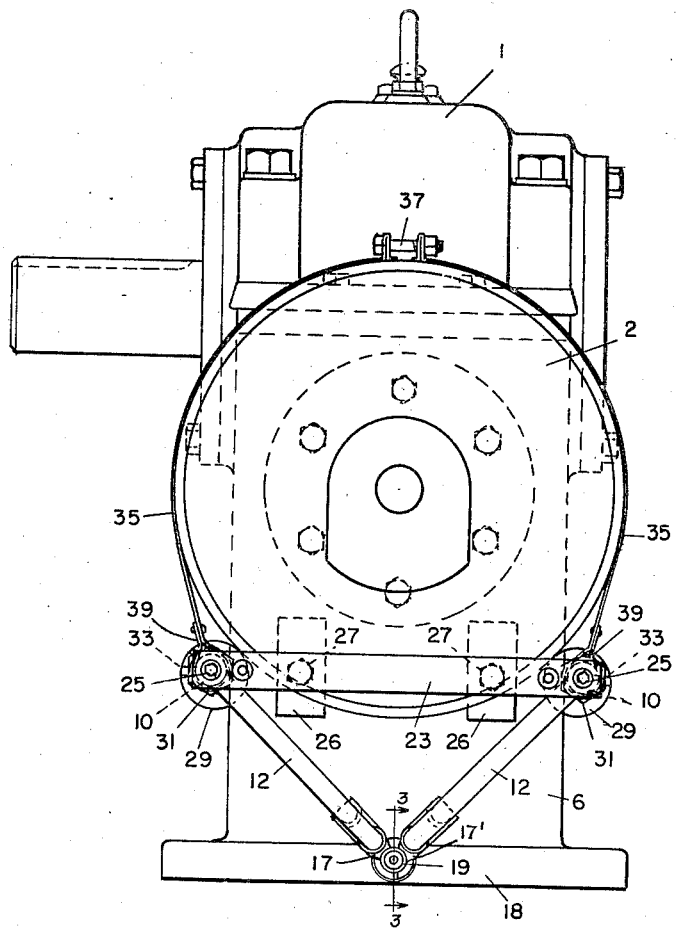
Fig. 2 is an end elevational view from the right-hand end of Fig. 1.
Figure 3:
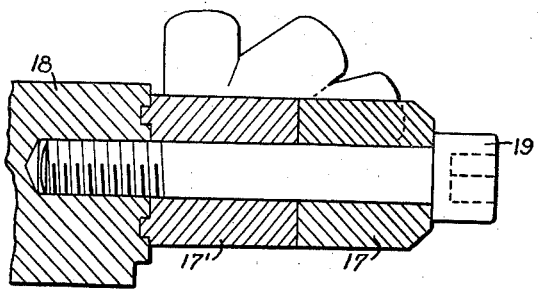
Fig. 3 is a detailed sectional view taken along line 3—3 of Fig. 2.

Each of the pair of previously described triangular framework members diverge from each other from the point of attachment by the bolt 19, so that the upper side bars 10 are spaced from each other. The upper side bars 10 are maintained in such spaced relationship and joined to each other by means of the bridging bars 22 and 23 mounted at each end of the pair of frame members. Allenhead cap screws 24 and 25 serve as suitable fastening means for connecting the bars 22 and 23, respectively, to the side bars 10. By varying the length of the bars 22 and 23 (such as by moving screws 24 and 25 to differently spaced holes as seen in Fig. 2), the space between the bars 10 can be made shorter or longer to accommodate a wide range of motor sizes. In other words, the width of the motor supporting seat, as determined by the parallel side bars 10, can be adjusted to any practical extent by the simple expedient of varying the length of the bridging bars 22 and 23. The socket pieces 17 and 17' have a pivoted or hinged connection to the bolt 19 so that they can be angularly adjusted with respect to each other about such bolt, thus accommodating the space adjusting movement of the two triangular framework members and the side bars 10.

The bar 22 is in turn fastened to the bosses 26 on the housing side wall 6, and by means of the cap screws 27.

Cams in the form of eccentrically mounted discs 28 and 29 on the bars 10 serve as means for adjustably supporting the drive motor 2 in both a horizontal and vertical plane with respect to the side bars 10, and coincidentally with respect to the center line of the machinery drive shaft 4. The cams 28 and 29 include the hexagonal nut portions 30 and 31 for receiving a suitable operating tool, and also the set screws 32 and 33 for locking the cams 28 and 29, respectively, in the desired position of rotational adjustment on the bars 10.

Retaining bands 34 and 35 pass around the housing of the motor 2 and are drawn into clamped position by means of the clamping nuts and bolts 36 and 37, respectively. The lower ends of the retaining bands 34 and 35 are connected to the bars 10 by the riveted loops indicated at 38 and 39.

It will thus be seen that when the drive motor 2 is placed upon the cams 28 and 29 that, by loosening the set screws 32 and 33 and rotating the cams, the motor 2 can be very accurately adjusted both vertically and horizontally so that the center line of its own drive shaft 3 is in precise alignment with the center line of the machinery drive shaft 4. After the drive motor 2 is set in properly aligned position, the set screws 32 and 33 are tightened and the motor held in such position on the support by tightening the clamping screws 36 and 37 on the retaining bands 34 and 35.

From the foregoing description, it will be seen that the drive motor supporting device of my invention can be readily attached to a machinery unit housing, such as the side wall housing of a worm gear speed reducer, without requiring any specially designed housing castings, i. e. my drive motor support can be applied to the housing walls of machinery units which originally were designed for connection to a drive motor mounted on a separate bed plate. It will also be appreciated that my drive motor supporting device consists essentially and simply of a pair of right triangularly shaped framework brackets which are joined to each other at a common point on the housing side wall and diverge outwardly from that point from each other to provide the supporting ways or supporting seat for the drive motor 2.

Other modes of applying the principle of the invention may be employed, change being made as regards the details described, provided the features stated in any of the following claims or the equivalent of such be employed.

I therefore particularly point out and distinctly claim as my invention:

1. A drive motor support for a machinery unit comprising a pair of triangularly shaped frame members, means for attaching one of the triangular sides of each of said frame members to the machinery unit at three points, two of such points being laterally spaced from each other, and the third of such points being common to both of said frame members, and means for attaching the drive motor to each of one other of the triangular sides of said frame members.

2. A drive motor support for a machinery unit comprising a pair of triangularly shaped frame members, one corner of one of said frame members being connected to the corresponding corner of the other frame member and both corners being attached to the machinery unit at a common point, said frame members diverging from each other at said common point, thereby laterally spacing each side of said frame members opposite said corner, means for attaching each one of said frame members to said machinery unit at a point removed from said common point, and means for attaching the drive motor to such spaced sides.

3. A drive motor support for a machinery unit comprising a pair of triangularly shaped frame members, one corner of each of said frame members being connected to the corresponding corner of the other frame member and both corners being attached to the machinery unit at a common point, said frame members diverging from each other at said common point, thereby laterally spacing each side of said frame members opposite said corner, means for attaching the drive motor to such spaced sides, and adjustable bearing elements contacting the drive motor housing and mounted on said spaced sides for varying the position of said drive motor with respect to said frame members.

4. In drive means for association with a gear unit housing having a vertical side wall and a drive shaft extending through said side wall, a drive motor, and a supporting frame for said drive motor, comprising a pair of right-triangularly shaped brackets, one leg and the hypotenuse of each of said brackets diverging from each other at a common point of attachment and being attached at such common point to said side wall, and the other leg of each of said brackets being spaced from and parallel to each other, and supporting said motor, each of said other legs being connected, adjacent its point of juncture with said one leg, at spaced points to said housing.

5. A drive motor support for a machinery unit comprising a pair of triangularly shaped frame members, means for attaching one of the triangular sides of each of said frame members to the machinery unit, means for attaching the drive motor to each of one other of the triangular sides of said frame members, and adjustable bearing elements contacting the drive motor housing and mounted on said other triangular sides for varying the position of the drive motor with respect to said frame members.

6. In drive means for association with a gear unit housing having a vertical side wall and a drive shaft extending through said side wall, a drive motor, a supporting frame for said motor comprising means for bracing from each side of the base of the motor and from the free end thereof to a central point below at the base of said housing, including a pair of right-triangularly shaped brackets, one leg of each of said brackets being attached to said housing and both legs converging together centrally below, and the hypotenuse legs of each of said brackets being directed to a common alignment centrally below the axis of said drive shaft, and the other legs extending substantially parallel laterally of the axis of said drive shaft, and rotatably mounted means on said last-named legs for supporting said motor.

7. In drive means for association with a gear unit housing having a vertical side wall and a drive shaft extending through said side wall, a drive motor, a supporting frame for said motor comprising means for bracing from each side of the base of the motor and from the free end thereof to a central point below at the base of said housing, including a pair of right-triangularly shaped brackets, one leg of each of said brackets being attached to said housing and both legs converging together centrally below, and the hypotenuse legs of each of said brackets being directed to a common alignment centrally below the axis of said drive shaft, and the other legs extending substantially parallel laterally of the axis of said drive shaft, and rotatably adjustable cams on said last-named legs for supporting said motor.

WARREN NOBLE.